United States Patent Office 3,003,499
Patented Oct. 10, 1961

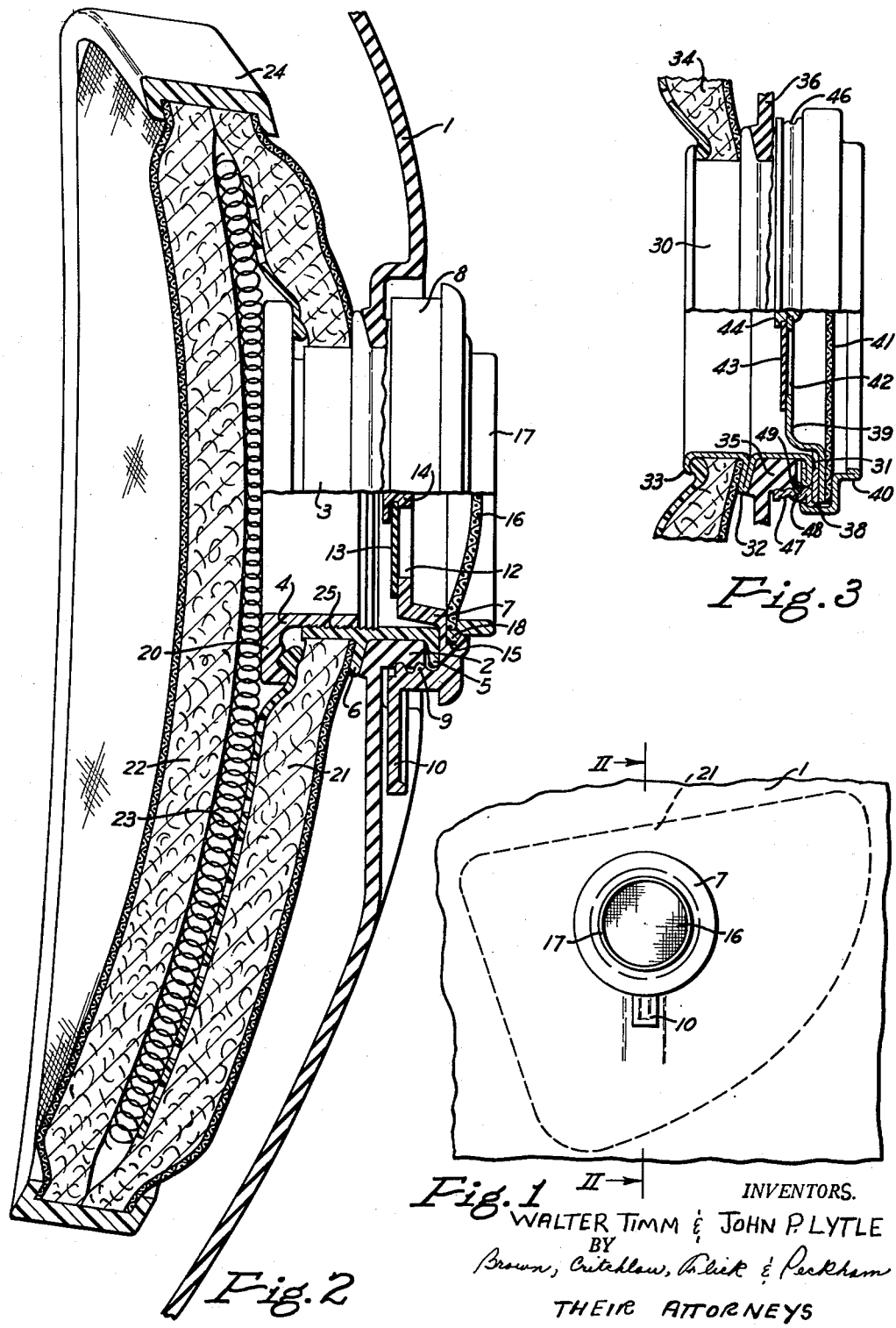

3,003,499
INLET VALVE ASSEMBLY FOR MASK FACEPIECE
Walter Timm and John P. Lytle, Pittsburgh, Pa., assignors to Mine Safety Appliances Company, Pittsburgh, Pa., a corporation of Pennsylvania
Filed Aug. 4, 1959, Ser. No. 831,619
7 Claims. (Cl. 128—141)

This invention relates to face masks, and more particularly to an inlet valve assembly designed for mounting in such masks.

It is among the objects of this invention to provide a mask inlet valve assembly which can be quickly and easily mounted in a mask facepiece or removed therefrom, which forms a good seal with the surrounding facepiece, and which is formed for supporting an air filter inside the mask.

In accordance with this invention a tubular connector is adapted to extend through a mask facepiece inlet opening that is encircled by an outwardly projecting flexible bead. The connector will engage the bead and is provided with flanges for straddling it. Seated on the outer flange of the connector is an inlet valve that extends across the connector. The valve has an annular flange encircling the connector and extending from the outer connector flange inwardly toward the other flange in a position to compress the bead against the connector. The central portion of the valve has an inlet port that opens into the connector, the port being closed by a closure member during exhalation. A screen may be mounted across the valve outwardly beyond its inlet port. The inner end of the connector projects into the mask and is formed for receiving and holding an air filter.

The invention is illustrated in the accompanying drawings, in which

FIG. 1 is a fragmentary side view of a mask facepiece showing the outer end of our inlet valve assembly;

FIG. 2 is an enlarged vertical section taken on the line II—II of FIG. 1, with the upper half of the inlet valve assembly shown in elevation; and FIG. 3 is a fragmentary view similar to FIG. 1, but showing a modification of the invention.

Referring to FIGS. 1 and 2 of the drawings, the rubber facepiece 1 of a gas mask or the like is provided with an inlet opening that is encircled by an outwardly projecting flexible bead 2. Extending through this opening in engagement with the bead is a tubular connector, preferably molded from a plastic. The connector is formed in two parts, an outer part 3 that is telescoped over an inner one 4 inside the mask. The outer member of the connector has a radial flange 5 around its outer end, and another flange 6 about half way between its ends. The two flanges straddle the facepiece bead, the inner flange generally engaging the inner end of the bead.

Seated on the outer flange 5 of the connector is an inlet valve that extends across the connector. The valve body 7, also of plastic, has an annular flange 8 that encircles the connector and extends from its outer flange inwardly toward the other connector flange 6. The valve flange therefore encircles the facepiece bead, and its inner surface is provided with one or more annular ribs 9 that press into the bead to form a seal and to press the bead against the side of the coupling. The seal thus formed prevents leakage into the mask around the connector. The inner end of valve flange 8 may be provided with a downwardly projecting lug 10 that can be pried up in order to remove the valve from the facepiece and connector. Ribs 9 will snap over the edge of the outer connector flange.

The central portion of the valve body has an inlet port 12 opening into the connector. This port is closed during exhalation by means of a flexible closure disc 13 mounted on an integral button 14 at the center of the valve. The central portion of the valve at the outer end of the connector preferably is encircled by an inwardly opening radial groove 15, in which the edge of a screen 16, preferably flocked, is clamped by a plastic ring 17 that is encircled by an integral rib 18 snapped into the groove.

The inner end of the inner part 4 of the connector is encircled by a flange 20, and the connector between that flange and the central flange 6 of the connector extends through an opening in the outer layer 21 of a double layer air filter. The two layers 21 and 22 are spaced apart by suitable spacing members, such as wire coils 23, and the edges of the two layers are clamped together and sealed by a surrounding plastic ring 24. To help hold the filter in place, the central flange of the connector slopes toward the inner end of the connector. The portion of the filter engaging the side wall of the connector is clamped in place by pushing the two parts of the connector axially toward each other. They are held in any desired position by interengaging ratchet teeth 25, which can be formed by molding annular serrations in the adjoining walls of the two parts of the connector.

In the modification shown in FIG. 3, the inlet valve assembly is made principally of sheet metal. Also, the connector 30 is made in one piece, but, like the other connector, it has an outer radial flange 31, an inwardly sloping central flange 32 and an inner flange 33. The outer layer 34 of an air filter is clamped between the inner flange and the central flange. The outer flange and the central flange straddle an outwardly projecting bead 35 around the inlet opening of a facepiece 36.

An inlet valve is formed from an annular base member 38 engaging the outer end of connector 30, a valve seat member 39 extending across the connector and engaging the outer surface of the base member, and a clamping ring 40 that clamps the base seat members tightly together. The ring can also be used for clamping a screen 41 against the valve seat member. The valve seat member projects into the connector and is provided with an inlet port 42, which is closed during exhalation by a flexible closure disc 43 mounted on a button 44 inserted in a small hole in the center of the seat member.

The valve base member 38 has an annular flange 46, which encircles the facepiece bead in tight sealing engagement with it. Preferably, the flange is crimped to provide it with an inwardly projecting rib 47 that presses into the side of the bead. To aid in holding the valve in position, flange 46 may also be provided with an interior annular groove 48, in which a snap ring 49 is mounted. This ring projects into engagement with the inner surface of the outer flange 31 of the connector to lock the valve onto the connector. However, if it is desired to remove the valve from the facepiece bead and the connector, that can be done by prying them apart, in which case the snap ring will expand and slip over the outer flange of the connector.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The combination with a mask facepiece having an inlet opening encircled by an outwardly projecting flexible bead, of an inlet valve assembly comprising a tubular connector extending through said opening in engagement with the bead and provided with flanges straddling the bead, and an inlet valve seated on the outer flange of the connector and extending across the connector, the valve having an annular flange encircling the connector in radially spaced relation therewith and extending from the outer connector flange toward the other connector flange, said annular flange encircling said bead and compressing it radially against the connector, the central portion of the valve having an inlet port that opens into said connector, and the valve including a closure member for closing said inlet port during exhalation.

2. An inlet valve assembly as recited in claim 1, in which the inner surface of said valve flange is provided with an annular rib pressing into said bead.

3. An inlet valve assembly as recited in claim 1, in which said connector is formed from inner and outer telescoping parts, the inner part having a flange around its inner end, and said parts being provided with interengaging ratchet teeth to hold them together, whereby a filter element can be clamped between the inner flange and said other flange of the connector.

4. The combination with a mask facepiece having an inlet opening encircled by an outwardly projecting flexible bead, of an inlet valve assembly comprising a tubular connector extending through said opening in engagement with the bead and provided with flanges straddling the bead, and an inlet valve seated on the outer flange of the connector and extending across the connector, the valve having an annular flange encircling the connector in radially spaced relation therewith and extending from the outer connector flange toward the other connector flange, said annular flange encircling said bead and compressing it radially against the connector, the central portion of the valve extending into the connector and having an inlet port that opens into said connector, a screen extending across the valve at the outer end of the connector and spaced from said inlet port, and the valve including a closure member for closing said inlet port during exhalation.

5. An inlet valve assembly as recited in claim 4, in which said central portion is encircled by an inwardly opening radial groove, and the valve includes a ring encircled by a rib seated in said groove, the ring clamping the edge of said screen against the rest of the valve.

6. The combination with a mask facepiece having an inlet opening encircled by an outwardly projecting flexible bead, of an inlet valve assembly comprising a tubular connector extending through said opening in engagement with the bead and provided with flanges straddling the bead, and an inlet valve seated on the outer flange of the connector and extending across the connector, the valve having an annular flange encircling the connector in radially spaced relation therewith and extending from the outer connector flange toward the other connector flange, said annular flange encircling said bead and compressing it radially against the connector, the central portion of the valve having an inlet port that opens into said connector, the valve including a closure member for closing said inlet port during exhalation, said valve flange being provided with an inwardly opening groove adjacent the inner surface of the outer flange of the connector, and a snap ring in said groove projecting into engagement with said inner surface to help hold the valve on the connector.

7. The combination with a mask facepiece having an inlet opening encircled by an outwardly projecting flexible bead, of an inlet valve assembly comprising a tubular connector extending through said opening in engagement with the bead and provided with flanges straddling the bead, an annular valve base member seated on the outer flange of the connector and having an annular flange encircling the connector in radially spaced relation therewith and extending from the outer connector flange toward the other connector flange, said annular flange encircling said bead and compressing it radially against the connector, a valve seat member seated on said base member and extending across the connector, the central portion of said seat member having an inlet port that opens into said connector, a closure member for closing said inlet port during exhalation, and a ring encircling said base and seat members and clamping them tightly together.

References Cited in the file of this patent
UNITED STATES PATENTS

| | | |
|---|---|---|
| 2,320,770 | Cover | June 1, 1943 |
| 2,341,566 | Monro | Feb. 15, 1944 |
| 2,505,173 | Conley | Apr. 25, 1950 |
| 2,823,671 | Garelick | Feb. 18, 1958 |